US009805397B2

(12) United States Patent
Sohn et al.

(10) Patent No.: US 9,805,397 B2
(45) Date of Patent: Oct. 31, 2017

(54) AUXILIARY CONTENT SUGGESTIONS RELATING TO USER GENERATED CONTENT

(71) Applicant: Google Inc., Mountain View, CA (US)

(72) Inventors: Timothy Youngjin Sohn, Mountain View, CA (US); Twum Djin, Santa Clara, CA (US); Andrew Chang Huang, Menlo Park, CA (US); Harim Kim, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 177 days.

(21) Appl. No.: 13/782,985

(22) Filed: Mar. 1, 2013

(65) Prior Publication Data
US 2014/0250176 A1 Sep. 4, 2014

(51) Int. Cl.
G06Q 30/00 (2012.01)
G06Q 30/02 (2012.01)
H04L 29/08 (2006.01)
G06Q 30/06 (2012.01)
G06Q 50/00 (2012.01)

(52) U.S. Cl.
CPC ..... *G06Q 30/0282* (2013.01); *G06Q 30/0631* (2013.01); *H04L 67/20* (2013.01); *G06Q 50/01* (2013.01); *H04L 67/02* (2013.01)

(58) Field of Classification Search
CPC .............................. G06G 30/06; G06G 30/08
USPC ................................................ 705/26.1–27.2
See application file for complete search history.

(56) References Cited

U.S. PATENT DOCUMENTS

| | | | |
|---|---|---|---|
| 8,448,072 B1* | 5/2013 | Lai et al. ...................... 715/753 |
| 2011/0047013 A1* | 2/2011 | McKenzie, III ............. 705/14.4 |
| 2011/0161413 A1* | 6/2011 | Cierniak ............. G06F 17/3089 709/203 |
| 2011/0258556 A1* | 10/2011 | Kiciman ................ G06Q 10/10 715/751 |
| 2012/0253917 A1 | 10/2012 | Cho et al. |

(Continued)

FOREIGN PATENT DOCUMENTS

KR 2013-0011257 A 1/2013

OTHER PUBLICATIONS http://heresthethingblog.com/2011/12/16/6-privacy-tips-locking-timeline/, Ben Patterson, Dec. 16, 2011.*

(Continued)

*Primary Examiner* — Ethan D Civan
*Assistant Examiner* — Ming Shui
(74) *Attorney, Agent, or Firm* — McDermott Will & Emery LLP (57) ABSTRACT

In one aspect, a method includes providing a post generated by a first user for display to one or more other users of the site, receiving an indication of a request from a second user of one or more other users to suggest auxiliary content relating to at least one of one or more items represented in the post, providing a suggestion mechanism to the second user on the page displaying the post to allow the second user to provide auxiliary content relating to the at least one of the one or more items, receiving a suggestion from the second user including the auxiliary content, providing the auxiliary content for display to the first user and providing the first user with a mechanism for viewing the auxiliary content.

21 Claims, 7 Drawing Sheets (56) References Cited

U.S. PATENT DOCUMENTS

2013/0013700 A1* 1/2013 Sittig et al. .................. 709/206
2013/0138735 A1* 5/2013 Kanter .................. G06Q 50/01
   709/204

OTHER PUBLICATIONS

Eric Eldon, Facebook Let's You Mark Friend Request with "Not Now," then Decide on Them Later, http://www.adweek.com/socialtimes/facebook-lets-you-mark-friend-requests-with-not-now-then-decide-on-them-later/247677?red=if, Sep. 17, 2010.*

* cited by examiner

AUXILIARY CONTENT SUGGESTIONS RELATING TO USER GENERATED CONTENT

BACKGROUND

User-generated content (UGC) sites are sustained by active users who upload and interact with content in the community. UGC sites may be built around a primary content source, such as fashion, food or home decor content being uploaded by the community. This content source is often augmented with auxiliary content that supports the primary post (e.g., tags to the content within the post). In many instances such auxiliary content is essential to promote interaction and help sustain a UGC community. There are however challenges regarding the inclusion of auxiliary content. The process of creating content with meaningful annotations can be a cumbersome, time consuming process requiring the primary content generator to search for and locate the auxiliary content relating to content, and to provide information for each item having auxiliary content. It may be beneficial to provide a mechanism to solicit help from community members to promote more activity and interaction with respect to a post, have more complete information regarding content on the site, and allow creators of posts to get the help of domain experts.

SUMMARY

The disclosed subject matter relates to a machine-implemented method including providing a post generated by a first user of a user generated content site for display on a page of the site to one or more other users of the site, the post including a representation of one or more items. The method further including receiving an indication of a request from a second user of one or more other users to suggest auxiliary content relating to at least one of the one or more items of the post. The method further including providing a suggestion mechanism to the second user on the page displaying the post, the suggestion mechanism allowing the second user to provide auxiliary content relating to the at least one of the one or more items. The method further including receiving a suggestion from the second user, the suggestion including auxiliary content relating to the at least one of the one or more items. The method further including providing the auxiliary content for display to the first user and providing the first user with a mechanism for viewing and accepting the auxiliary content.

Other aspects can be embodied in corresponding systems and apparatus, including computer program products. These and other aspects can include one or more of the following features. The at least one item may include a representation of a product and where the auxiliary content includes a link to one or more of the product or a related product. The post may include a photograph, and the representation of the product may include the product being visually included with the photograph. The link is to a first site may provide information regarding one or more of the product or related product or providing one or more of the product or related product for purchase.

The method may further include displaying a suggestion pending notification to the second user after providing the auxiliary content for display to the first user, where the suggestion pending notification is displayed to the second user until the first user accepts the suggestion. The method may further include determining that the first user has accepted the suggestion and adding the auxiliary content to the post.

Providing the post for display to the one or more other users may include receiving an indication of a post being created by the first user and providing the post for display to the one or more other users in response to the indication. The auxiliary content may be viewable by only the first user and the second user until the first user accepts the suggestion. The second user may be able to view and interact with the post while the suggestion mechanism is being displayed.

The suggestion mechanism may provide a search mechanism that allows the user to search for auxiliary content relating to at least one of the one or more items. The method of claim 1, wherein the suggestion mechanism provides a search mechanism that allows the user to search for auxiliary content relating to at least one of the one or more items. The mechanism may provide the user with a mechanism for accepting the suggestion or postponing the viewing or acceptance of the suggestion to a later time.

The disclosed subject matter also relates to a system including one or more processors and a machine-readable medium including instructions stored therein, which when executed by the processors, cause the processors to perform operations including receiving an indication of a request to suggest auxiliary content relating to a post generated by a first user from a second user viewing the post. The operations further including providing a suggestion mechanism to the second user on the page displaying the post, the suggestion mechanism allowing the second user to search for auxiliary content or enter new auxiliary content relating to the post. The operations further including receiving a suggestion from the second user, the suggestion including auxiliary content relating to the post. The operations further including providing the auxiliary content for display to the first user and providing a mechanism for the user to accept the suggestion.

Other aspects can be embodied in corresponding systems and apparatus, including computer program products. These and other aspects can include one or more of the following features. The operations may further include receiving an indication of the first user accepting the suggestion and adding the auxiliary content to the post. The operations may further include providing one or more auxiliary content relating to the post for display along with the post, wherein the auxiliary content is provided for display after being added to the post.

The operations may further include displaying a suggestion pending notification to the second user after providing the suggestion for display to the first user. The suggestion pending notification may be displayed to the second user until it is determined that the first user has accepted the suggestion. The operations may further include providing a mechanism to the second user to withdraw the suggestion until it is determined that the first user has accepted the suggestion.

The post may include a representation of one or more items, and where the auxiliary content relates to at least one item of the one or more items. The post may include a photograph and the at least one item may include a visual representation of a product and where the auxiliary content includes a link to one or more of the product or a related product. The link may be to a first site providing information regarding one or more of the product or related product or providing one or more of the product or related product for purchase.

The operations may further include receiving an indication of a post being created by the first user and providing the post for display to one or more other including the second user in response to the indication.

The disclosed subject matter also relates to a machine-readable medium including instructions stored therein, which when executed by a machine, cause the machine to perform operations including receiving a request to provide auxiliary content relating to a post generated by a first user from a second user viewing the post, the post including a visual representation of one or more items. The operations further including providing a suggestion mechanism to the second user on the page displaying the site, the suggestion mechanism allowing the second user to search for auxiliary content relating to at least one of the one or more items or enter new auxiliary content. The operations further including receiving a suggestion from the second user, the suggestion including auxiliary content relating to the at least one of the one or more items. The operations further including providing the auxiliary content for display to the first user, where the user is able to view the auxiliary content and accept the suggestion or postpone the viewing or acceptance of the suggestion. The operations further including determining if the user has accepted the suggestion. The operations further including displaying a suggestion pending notification to the second user until it is determined that the user has accepted the suggestion and adding the auxiliary content to the post when it is determined that the user has accepted the suggestion.

These and other features of the invention described throughout the application provide one or more advantages, including but not limited to, facilitating an easier content generation process at a UGC site, encouraging user participation and collaboration at the site, and allowing users to benefit from the knowledge of other users regarding content posted to the UGC site.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details.

The subject disclosure provides a method and system for suggesting auxiliary content (e.g., to be represented as tags) relating to content of a post. The process facilitates promoting suggestions within the community with respect to auxiliary data relating to content (e.g., posts) generated by users, and mechanisms to streamline the process of sharing the content creation and supplementation process.

A method is providing for allowing for community members in a UGC site to seamlessly propose auxiliary content relevant to primary content posted to the site (hereinafter referred to as a "post"). The UGC site may be a social networking site where social interaction between one or more users is facilitated and/or desired. The process facilitates collaboration for providing auxiliary content. The process, thus, provides a solution to the existing challenges of annotating posts, by allowing post creators to defer and delegate annotating posts, making the process quicker and encouraging more content creation. In addition, users are enabled to use the collective knowledge of the community to provide information that the content creator may not know. Through the use of the collaborative process, users of the site (e.g., contacts of the user) may suggest information (e.g., products, people, information, etc.) that a content creator may not know, and suggest information relating to the content (e.g., similar products or services, similar people, information regarding similar content) that may be relevant to the post.

Once a user creates a post, the post is provided for display to other users at the site (e.g., users with permission to view the posts, such as contacts). In addition, a mechanism (e.g., a button or text field) is provided, encouraging users viewing the post to provide auxiliary content regarding the content of the post. The mechanism is displayed in a prominent manner so that members of the community are encouraged to engage with the post.

Upon viewing a post, a user viewing the post ("viewer") may decide to suggest auxiliary content relating to the content of a post to the user who created or posted the post ("creator"). In one example, the content may include a representation a specific product (e.g., a photo depicting the product) and the viewer may have information regarding the product or similar products or related services. Information regarding a product or service may include a link to a site including information (e.g., features, ratings, reviews) regarding the product, a link to a site where the product or related services may be purchased, a link to related products (e.g., supplemental or similar products), a snippet regarding the product, a link to articles or other content regarding the product, and similar related content.

When the viewer chooses to suggest auxiliary content relating to a post being displayed, a mechanism is provided which allows the viewer to enter suggestions for auxiliary content relating to the content. In one example, a suggestion box is presented to the user in situ to allow the user to search for, locate, add and/or suggest information while viewing the post in the context (e.g., while looking at the post within the UGC site). Upon being presented with the suggestion box, the viewer can search for information (e.g., a product to suggest) or enter information (e.g., a URL to a product page). The product page can be any website including information regarding the product or related products or services, or a merchant page offering the product or related products or services for sale. Once the viewer enters information, a suggestion is generated and sent to the post creator. Through the suggestion box, users are able to quickly find auxiliary content (e.g., products) to suggest, or users (e.g., domain experts) that know information (e.g., products) in the post can paste a URL to the information to create a suggestion.

In some implementations, the suggestion may be made visible to only the original post creator and the viewer who suggested the auxiliary content. In some implementations, notification is sent to the post creator providing the information and notifying the creator that the suggested information is pending approval. Both the suggestion callout and quick process for adding auxiliary content simplify the process for suggesting new auxiliary content ("tags").

The original post creator can decide to accept the suggestion or look at the suggestion at a later time. In some examples, if the creator chooses to look at a suggestion later, the suggestion will appear as pending to the user suggesting the information. In one example, same or similar information may be displayed to the user suggesting the information if the creator rejects the information. Allowing the original post creator to address the suggestion later is important because of the social implications involved with rejecting a suggestion. The creator is provided with plausible deniability and does not have to worry about potentially creating an uncomfortable social situation by denying a suggestion. The user suggesting the information can only see whether a suggestion is pending until the suggestion is accepted. As long as the suggestion has not been accepted, the user who suggested the information can cancel the suggestion to remove the suggestion.

The mechanism allows content creators to take advantage of the knowledge of domain experts and/or other users in the community who may have additional information regarding a post created by the user. The ease, with which third party users can suggest information to be added to user generated content, encourages community participation. Users are encouraged to create posts even when they do not wish to fully annotate the content, or do not have enough knowledge, or when seeking information on specific content, so that they can be annotated by other users.

UGC sites as discussed herein refer to a collaboration site or other similar sites where users may post various user-generated content (UGC) and/or may interact with content provided by one or more other users. The UGC sites may include any site on which content may be shared, viewed by other users and which the user can interact with. User generated content may cover a range of media content including files, documents, audio, video, images, text, and other content posted on a UGC site. UGC sites may include question-answer databases, digital video sites, podcasting, blogging, forums, review sites, wikis, social networking sites. An example UGC site may be hosted at a social networking service. The phrase "social networking service" as used herein encompasses its plain and ordinary meaning, including, but not limited to, an online service, platform or site that focuses on building and reflecting of social associations among users. These associations may be stored within a social graph at each social networking service (e.g., maintained at remote server(s) 120). Users of social networking services may create associations with one another. Such user associations may be defined on a user-to-user basis, or as a group of users associated through membership within a group. As used herein, "contacts" refer to other users that a user is associated with, at one or more social networking services. A user may control the distribution and visibility of content generated by the user such as multimedia content (e.g., photos, documents, and other collaboration objects).

Figure 1:
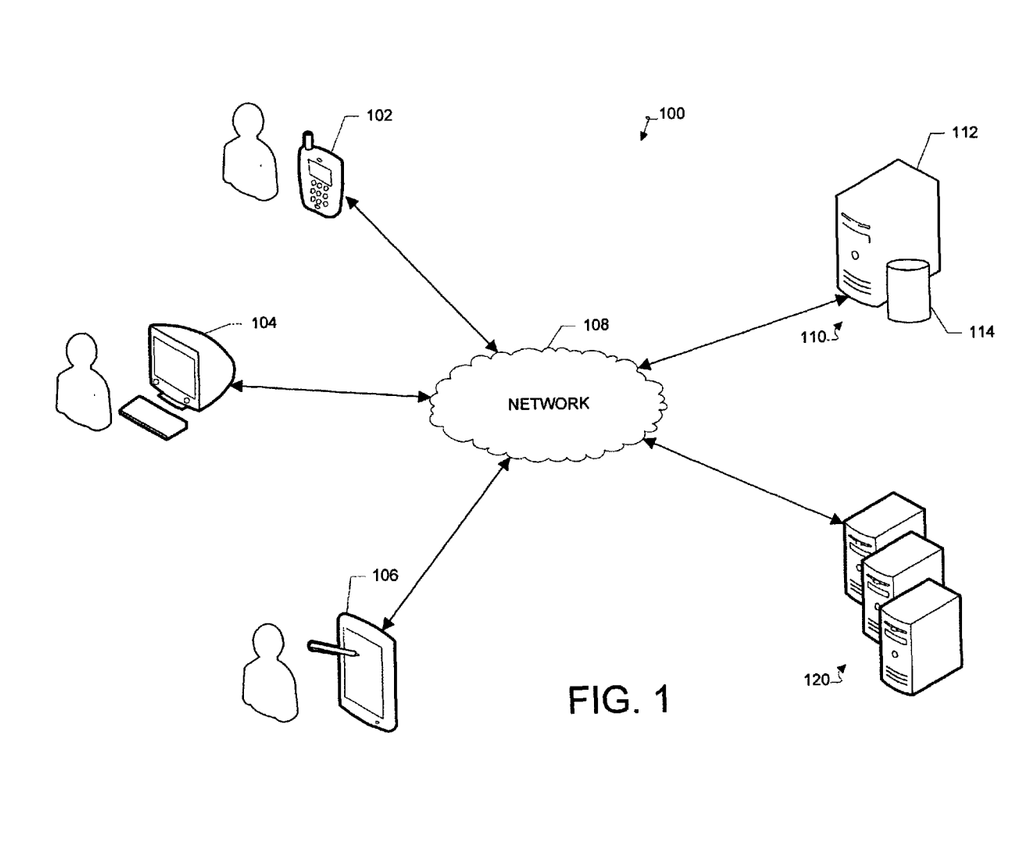
FIG. 1 illustrates an example client-server network environment, which provides for facilitating suggestion of auxiliary content for content posted to a UGC site.

FIG. 1 illustrates an example client-server network environment, which provides for facilitating suggestion of auxiliary content for content posted to a UGC site. A network environment 100 includes a number of electronic devices 102, 104, 106 communicably connected to a server 110 and remote servers 120 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example implementations, electronic devices 102, 104, 106 can be computing devices such as laptop or desktop computers, smartphones, PDAs, portable media players, tablet computers, or other appropriate computing devices. In the example of FIG. 1, electronic device 102 is depicted as a smartphone, electronic device 104 is depicted as a desktop computer and electronic device 106 is depicted as a PDA.

In some implementations, server 110 includes a processing device 112 and a data store 114. Processing device 112 executes computer instructions stored in data store 114, for example, to facilitate receiving suggestions regarding content posted on a UGC site from users interacting with electronic devices 102, 104, 106. Server 110 may further be in communication with remote servers 120 either through the network 108 or through another network or communication means.

In one example, the system may further comprise one or more other remote servers 120 performing various functionalities and/or storage capabilities described herein with regard to the server 110 either alone or in combination with server 110. Server 110 may further maintain or be in communication with UGC sites hosted on one or more remote server 120. The one or more sites hosted at remote server(s) 120 may provide various services and may enable users to create a profile and associate themselves with other users. The server 110 and/or the one or more remote servers 120 may further facilitate the generation and maintenance of a social graph including the user created associations. The social graphs may include, for example, a list of all users of the UGC site(s) and their associations with other users of a UGC site.

In some example aspects, server 110 and/or one or more remote servers 120 can be a single computing device such as a computer server. In other implementations, server 110 and/or one or more remote servers 120 can represent more than one computing device working together to perform the actions of a server computer (e.g., cloud computing). Server 110 and/or one or more remote servers 120 may be coupled with various remote databases or storage services. While server 110 and the one or more remote servers 120 are displayed as being remote from one another, it should be understood that the functions performed by these servers may be performed within a single server, or across multiple servers.

Communications between the client devices 102, 104, 106, server 110 and/or one or more remote servers 120 may be facilitated through the HTTP communication protocol. Other communication protocols may also be facilitated including for example, XMPP communication, for some or all communications between the client devices 102, 104, 106, server 110 and one or more remote servers 120 (e.g., through network 108).

Users may interact with the system hosted by server 110, and/or one or more UGC sites hosted by remote servers 120, through a client application installed at the electronic devices 102, 104, 106. Alternatively, the user may interact with the system and the one or more social networking services through a web based browser application at the electronic devices 102, 104, 106. Communication between client devices 102, 104, 106 and the system, and/or one or more UGC sites, may be facilitated through a network (e.g., network 108).

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
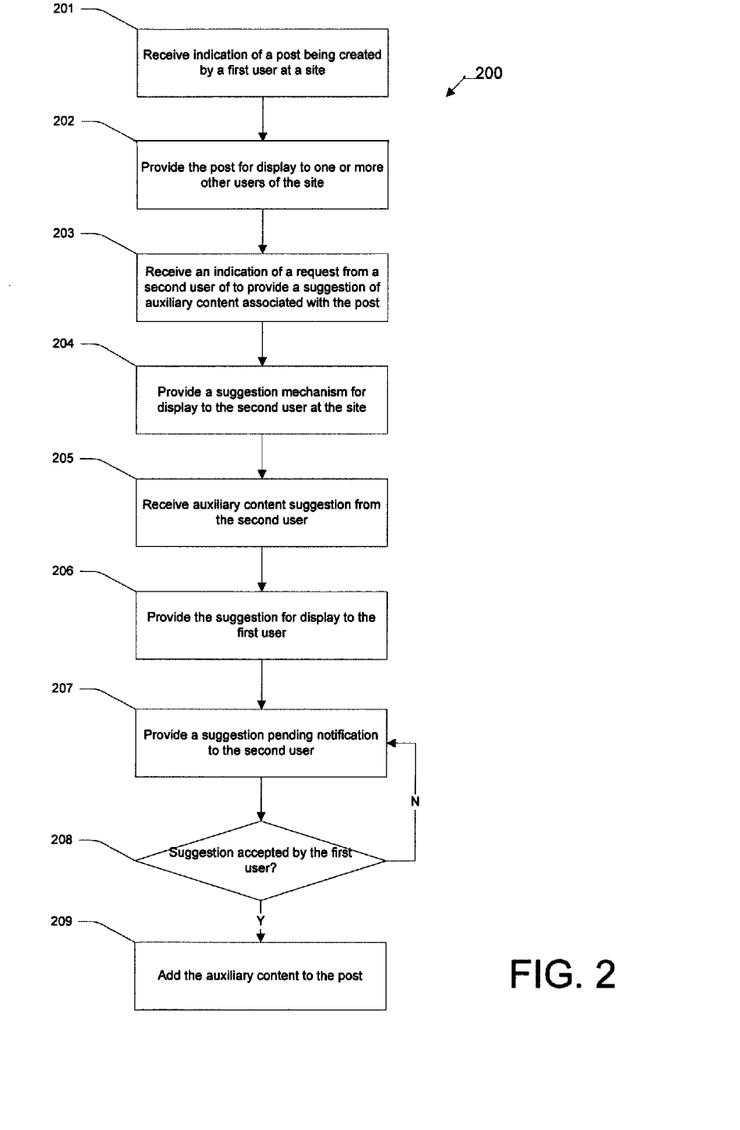
FIG. 2 illustrates a flow diagram of an example process for facilitating suggestions for auxiliary content posted to a UGC site.

FIG. 2 illustrates a flow diagram of an example process 200 for facilitating suggestions for auxiliary content posted to a UGC site. The user generated content may comprise a photo including one or more items (e.g., products). The auxiliary content may refer to information regarding items (e.g., products) within the photo. In step 201 an indication for a post created by a first user at the UGC site is received. The content may comprise various multimedia content, and may contain representations (e.g., textual or visual) of one or more items (e.g., people, products, services, locations). In one example, the content comprises a photo, video or other visual content comprising a visual representation of one or more items. The first user may generate the post by uploading the content or by generating the content using various mechanisms directly provided at the site. Once the user creates the content, the user may choose to post the content to the site.

In step 202, the post is provided for display to one or more other users of the site. In one example, the distribution of the post may be controlled by one or more access control rules, defined by system or user preferences or settings. In one example, the post may be a public post and may be provided for display to all users of the site (e.g., based on the preferences of the users). In another embodiment, the post may be provided for display to a defined set of user (e.g., contacts of the user).

Figure 3:
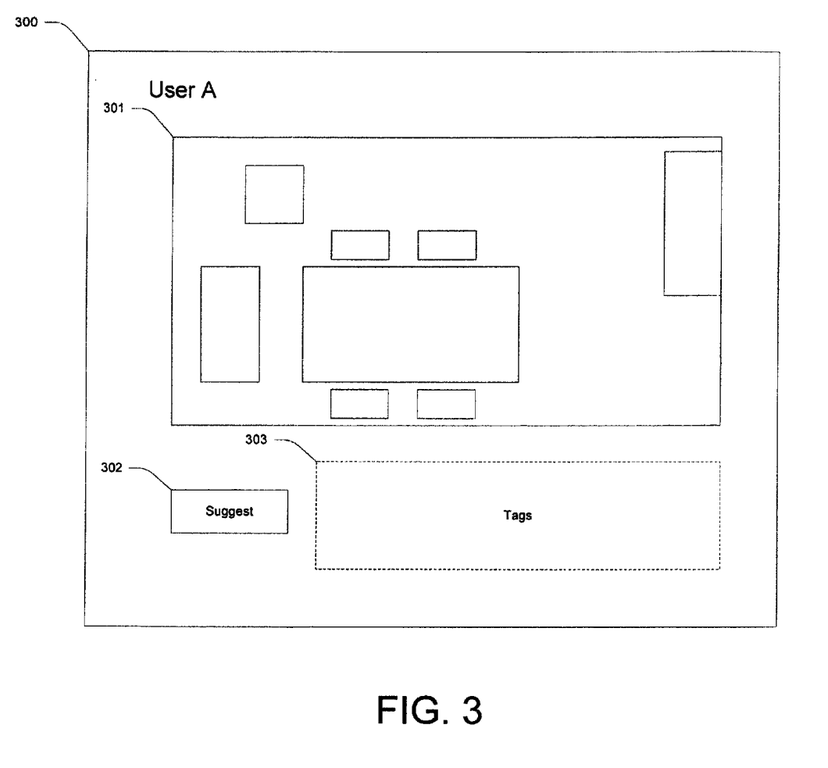
FIG. 3 illustrates an example user interface displaying a UGC site page providing a post generated by a first user for display to one or more other users at a UGC site.

In step 203, an indication of a request to suggest auxiliary content relating to the content of the post is received from a second user viewing the post. In one example, the post may be provided for display along with a suggestion mechanism allowing users viewing the post at the site to provide suggestions of auxiliary content relating to the post. For example, an add suggestion button may be provided to the user. FIG. 3, described in detail below, illustrates an example graphical user interface displaying a post created by the first user and an add suggestion mechanism being displayed to the second user. The user may select the add suggestion mechanism (e.g., button) to provide a suggestion of auxiliary content relating to the post being displayed.

Figure 4:
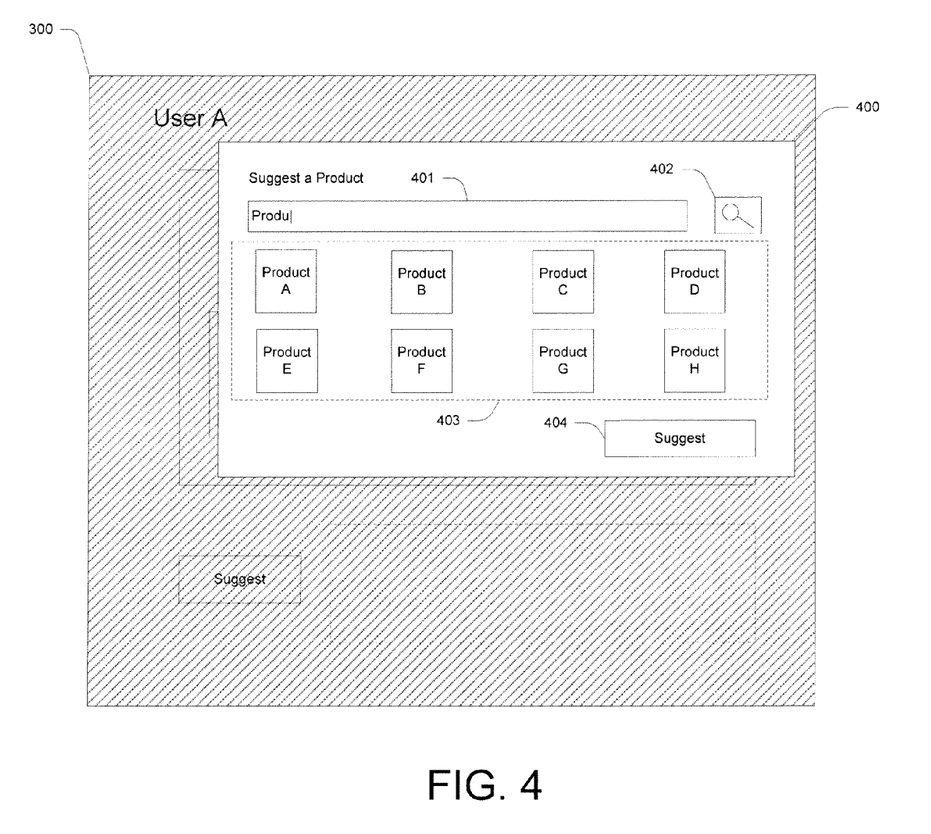
FIG. 4 illustrates an example graphical interface displaying a suggestion mechanism at a UGC site page.

In step 204, a suggestion mechanism is provided for display to the second user at the site. The Suggestion mechanism may be displayed in situ (e.g., overlaid on the window displaying the post, or alongside the post), such that the user is able to search for and add auxiliary content suggestions while viewing the post and in the context of viewing the UGC site. In one example, the suggestion mechanism provided for display in step 204 provides the user with search capability such that the second user is able to search for auxiliary content relating to the post using the suggestion mechanism while at the page displaying the post (e.g., information or content relating to an item within the post). In some instances, the second user may enter auxiliary content by searching for content and selecting a search result as the suggested auxiliary content or may enter auxiliary content (e.g., a URL) directly into the suggestion box. FIG. 4, described in more detail below, illustrates an example suggestion mechanism (a suggestion window) provided for display to a user.

Figure 5:
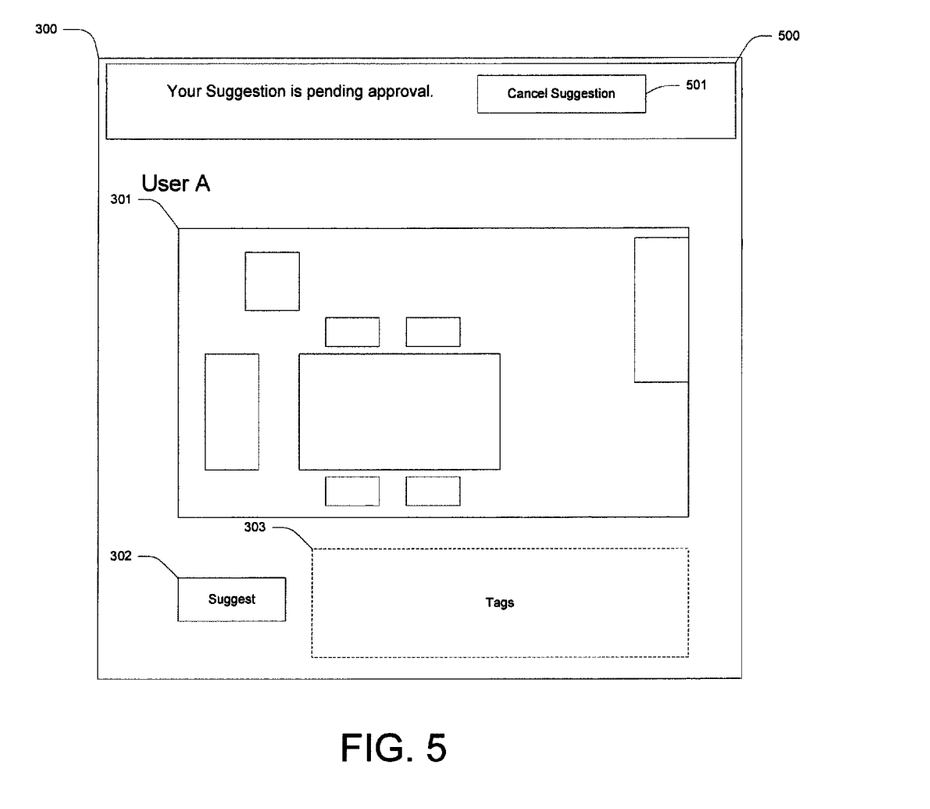
FIG. 5 illustrates an example graphical user interface displaying a suggestion pending notification within a UGC site page.

In step 205, the auxiliary content entered by the second user is received. In step 206, the auxiliary content is provided to the first user (e.g., the creator of the post) and the user can view the auxiliary content and decide whether to accept the content or postpone the decision to a later point in time. In step 207, a suggestion pending notification is provided for display to the second user. FIG. 5, described in more detail below, illustrates an example graphical user interface including a suggestion pending notification. In some instances, as long as the first user has not accepted the suggestion, the suggestion pending notification is displayed to the second user, and the second user may cancel the suggestion at any time until the suggestion is accepted by the user.

In step 208, it is determined if the suggestion has been accepted by the first user. In one example, the first user is provided with a notification of the auxiliary content suggestion by the second user, and may select to accept the suggestion (e.g., using a mechanism included within the notification). If, in step 208, it is determined that the suggestion has been accepted by the first user, the auxiliary content is added to the post. Otherwise, the suggestion pending notification is displayed to the second user until it is determined that the first user accepted the suggestion in step 208, or the second user removes the suggestion.

FIG. 3 illustrates an example user interface displaying a UGC site page 300 providing a post generated by a first user for display to one or more other users at a UGC site. The UGC page 300 includes post 301, here a photograph, containing one or more items. The post 301 includes representations of several items (shown as boxes within the post 301). An auxiliary content display area 303 may be provided, displaying auxiliary content relating to the post 301 (e.g., tags). Additionally, an add suggestion mechanism 302 is provided for display, allowing the user viewing the post to select the mechanism in order to suggest auxiliary content relating to post 301 to the first user.

FIG. 4 illustrates an example graphical interface displaying a suggestion mechanism 400 at a UGC site page 300. The suggestion mechanism 400 may be displayed to a user once the user selects the add suggestion mechanism 302 displayed on page 300. As described, suggestion mechanism 400 is displayed in situ on the UGC site page displaying the post 301. The UGC site page 300 is shown as being grayed out for illustration purposes. In various instances, the user may be able to interact regularly with the content of the page 300 while the suggestion mechanism 400 is being displayed to the user. The suggestion mechanism includes a suggestion box 401 for entering auxiliary content (e.g., a URL) and/or providing key terms to search for auxiliary content to suggest. A search button 402 is provided to allow the user to search for auxiliary content using key terms or phrases entered into the suggestion box 401. Once the user enters key terms or phrases into the suggestion box, the key terms may be used to search for auxiliary content (e.g., products) to provide as search results within a search result area 403. The search result area 403 includes the results of the search (e.g., products A-H). Once the user has entered auxiliary content into the suggestion box 401, or selected an item from the search result area 403, the user may provide the auxiliary content as the suggestion using "suggest" button 404. In some instances, the suggestion may be provided by other means.

FIG. 5 illustrates an example graphical user interface displaying a suggestion pending notification 500 within a UGC site page 300. The suggestion pending notification 500 may be displayed on the page 300 displaying the post 301 relating the suggestion by the user. The search pending notification may include a message letting the user know that their suggestion is pending and may also provide a "Cancel Suggestion" button 501 for the user to withdraw their suggestion while the suggestion is pending. The suggestion pending notification 500 may be displayed to the user until the originator of the post accepts the suggested auxiliary content, at which time the auxiliary content is added to the post 301 and may be displayed within the auxiliary content area 303 of the page 300.

Figure 6:
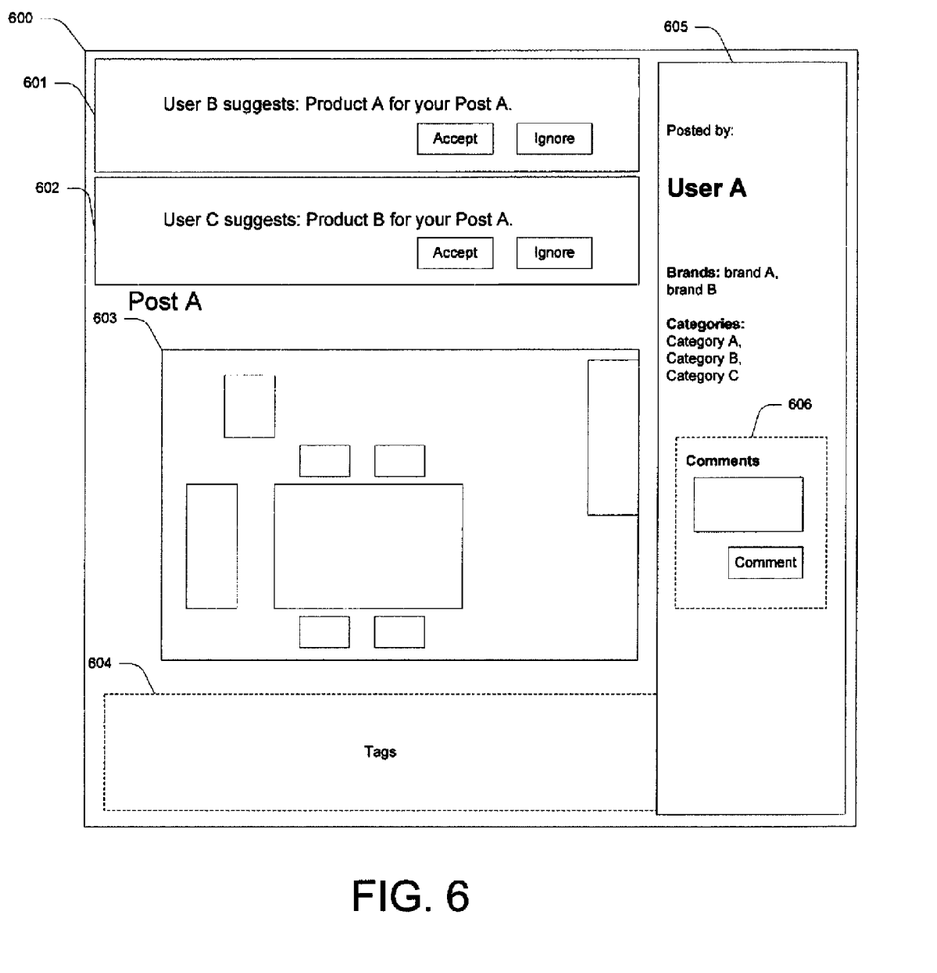
FIG. 6 illustrates an example user interface displaying a UGC site page 600 providing a post generated by a first user along with one or more suggestion notifications for display to the first user at a UGC site.

FIG. 6 illustrates an example user interface displaying a UGC site page 600 providing a post generated by a first user along with one or more suggestion notifications for display to the first user at a UGC site. The UGC page 600 includes post 301, here a photograph, containing one or more items. The post 301 includes representations of several items (shown as boxes within the post 301). An auxiliary content display area 603 may be provided, displaying auxiliary content relating to the post 301 (e.g., tags). The UGC page 600 further includes a post information area 604 providing information regarding the post including the brands and/or categories associated with the post for display. In one example, the post information area may further include a comments area 605 for displaying one or more comments by one or more users including the first user. A comment mechanism may further be provided within the post area 605 allowing the user to post comments regarding the post 301.

As described above, one or more users may provide suggestions of one or more auxiliary content to be added to the post. As illustrated in FIG. 6, when users make suggestions, the first user may be provided with suggestions notifications including a mechanism to accept the suggestion or to postpone the acceptance (or ignore) the suggestion. The UGC page 600 illustrated in FIG. 6 includes a first suggestion notification 601 and a second suggestion notification 602. Each suggestion notification 601 and 602 includes a message identifying one or more of the user which made the suggestion, the post to which the suggestion pertains and the auxiliary information (e.g., a product identifier). Each suggestion notification 601 and 602 further includes an "accept" button for accepting the suggestion and thus adding the suggested auxiliary content to the post 301, and an "ignore" button. The ignore button may be use to reject the suggestion and/or to postpone the acceptance of the rejection to a later point in time. In one example, one the user presses the "accept" button with respect to one of the suggestions notification 601 or 602, the auxiliary information associated with the suggestion is added to the post 301 and may be displayed within the auxiliary content display area 603.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 7:
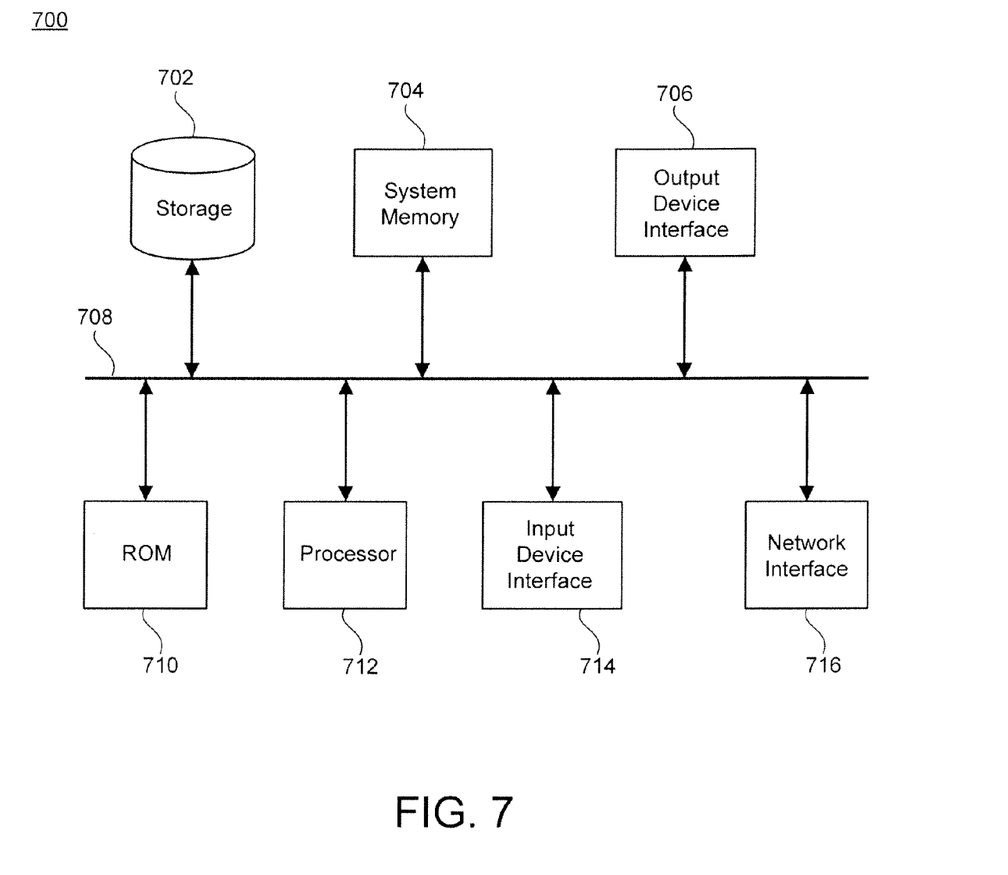
FIG. 7 conceptually illustrates an electronic system with which some implementations of the subject technology are implemented.

FIG. 7 conceptually illustrates an electronic system with which some implementations of the subject technology are implemented. Electronic system 700 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 700 includes a bus 708, processing unit(s) 712, a system memory 704, a read-only memory (ROM) 710, a permanent storage device 702, an input device interface 714, an output device interface 706, and a network interface 716.

Bus 708 collectively represents all system, peripheral, and chipset buses that communicatively connect the numerous internal devices of electronic system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such a random access memory. System memory 704 stores some of the instructions and data that the processor needs at runtime. In some implementations, the processes of the subject disclosure are stored in system memory 704, permanent storage device 702, and/or ROM 710. For example, the various memory units include instructions for facilitating suggestion of auxiliary content for a post. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the electronic system. Input devices used with input device interface 714 include, for example, alphanumeric keyboards and pointing devices (also called "cursor control devices"). Output device interfaces 706 enables, for example, the display of images generated by the electronic system 700. Output devices used with output device interface 706 include, for example, printers and display devices, such as cathode ray tubes (CRT) or liquid crystal displays (LCD). Some implementations include devices such as a touchscreen that functions as both input and output devices.

Finally, as shown in FIG. 7, bus 708 also couples electronic system 700 to a network (not shown) through a network interface 716. In this manner, the computer can be a part of a network of computers (such as a local area network ("LAN"), a wide area network ("WAN"), or an Intranet, or a network of networks, such as the Internet. Any or all components of electronic system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A machine-implemented method, comprising:
   providing, by one or more processors over a network, a post generated by a first user of a user generated content service for display via a graphical user interface to one or more other users of the content service, the post comprising a representation of one or more items and the post being a single content item;
   receiving, by the one or more processors over the network, an indication of a request from a second user of one or more other users to suggest auxiliary content relating to at least one of the one or more items of the post;
   providing, by the one or more processors over the network, a search field and a search results area of a suggestion mechanism to the second user contemporaneously with displaying the post via the graphical user interface, the suggestion mechanism being added to the graphical user interface and allowing the second user to provide auxiliary content relating to the at least one of the one or more items, the search field to search for content separate from the post and the search results area to provide one or more results of the search;
   receiving, by the one or more processors over the network, via the suggestion mechanism displayed contemporaneously with the post, and responsive to the post generated by the first user, a suggestion provided via the search results area of the suggestion mechanism by the second user, the suggestion comprising auxiliary content relating to the at least one of the one or more items;
   providing, by the one or more processors over the network, the auxiliary content for display to the first and second users of the content service but not the one or more other users of the content service subsequent to the second user submitting the suggestion and prior to the first user accepting the auxiliary content; and
   providing, by the one or more processors over the network and for display to the first user, a mechanism comprising a first selectable graphical element to accept the auxiliary content and a second selectable graphical element to postpone viewing or accepting the auxiliary content to a later time; and
   providing, by the one or more processors, the post including the auxiliary content for display to the one or more other users of the content service in response to determining that the first user who generated the post has interacted with the mechanism to accept the suggestion.

2. The method of claim 1, wherein the at least one of the one or more items comprises a representation of a product and wherein the auxiliary content comprises a link to one or more of the product or a related product.

3. The method of claim 2, wherein the post comprises a photograph, and wherein the representation of the product comprises the product being visually included with the photograph.

4. The method of claim 2, wherein the link is to a first site providing information regarding one or more of the product or related product or providing one or more of the product or related product for purchase.

5. The method of claim 1, further comprising:
providing, by the one or more processors over the network, a suggestion pending notification for display to the second user after providing the auxiliary content for display to the first user, wherein the suggestion pending notification is provided for display to the second user until the first user accepts the suggestion.

6. The method of claim 1, further comprising:
adding, by the one or more processors, the auxiliary content to the post when the first user who generated the post interacts with the mechanism to accept the suggestion.

7. The method of claim 1, wherein providing the post for display to the one or more other users comprises:
receiving, by the one or more processors, an indication of the post being created by the first user; and
providing, by the one or more processors, the post for display to the one or more other users in response to the indication.

8. The method of claim 1, wherein the second user is able to interact with the auxiliary content suggested for the post generated by the first user after submitting the auxiliary content and prior to the first user accepting the auxiliary content.

9. The method of claim 1, wherein the second user is able to view and interact with the post while the suggestion mechanism is being displayed to the second user.

10. The method of claim 1, wherein the suggestion mechanism allows the second user to suggest searched for content that is separate from the post.

11. The method of claim 1, wherein the post is provided for display on a page and the search field and the search results area of the suggestion mechanism are provided for display on the page at least partially overlapping the post.

12. The method of claim 1, further comprising:
receiving, from the second user, subsequent to the second user submitting the suggestion and prior to the first user accepting the auxiliary content, a request for the auxiliary content; and
providing, by the one or more processors over the network, subsequent to the second user submitting the suggestion and prior to the first user accepting the auxiliary content, the auxiliary content to the second user responsive to receiving the request for the auxiliary content from the second user.

13. A system comprising:
one or more processors; and
a non-transitory machine-readable medium comprising instructions stored therein, which when executed by the processors, cause the processors to perform operations comprising:
receiving, over a network, an indication of a request to suggest auxiliary content relating to a post generated by a first user from a second user viewing the post, the post being provided for display to a plurality of other users;
providing, over the network, a search area of a suggestion mechanism for display to the second user in conjunction with a display of the post via a graphical user interface, the search area to search for auxiliary content or enter new auxiliary content relating to the post, the suggestion mechanism being incorporated into the graphical user interface displaying the post;
receiving, over the network, a suggestion submitted by the second user via the search area of the suggestion mechanism and responsive to the post generated by the first user, and the suggestion comprising auxiliary content relating to the post;
providing, over the network, the auxiliary content for display to the first user and the second user, but not for display to the plurality of other users, subsequent to receiving the suggestion from the second user and prior to the first user accepting the suggestion;
providing, over the network, a first selectable graphical element for display to the first user to accept the suggestion and a second selectable graphical element for display to the first user to postpone viewing or accepting the suggestion to a later time; and
providing the post including the auxiliary content for display to the plurality of other users in response to receiving an indication of the first user selecting the first selectable graphical element to accept the suggestion.

14. The system of claim 13, the operations further comprising:
adding the auxiliary content to the post.

15. The system of claim 14, the operations further comprising:
providing the auxiliary content relating to the post for display along with the post, wherein the auxiliary content is provided for display after being added to the post.

16. The system of claim 13, the operations further comprising:
providing, over the network, a suggestion pending notification for display to the second user after providing the suggestion for display to the first user, wherein the suggestion pending notification is provided for display to the second user until it is determined that the first user has accepted the suggestion.

17. The system of claim 16, the operations further comprising:
providing, over the network, a mechanism for display to the second user to withdraw the suggestion, after having submitted the suggestion over the network, exclusively until it is determined that the first user has accepted the suggestion, wherein the second user is prevented from withdrawing the suggestion after it is determined that the first user has accepted the suggestion.

18. The system of claim 13, wherein the post comprises a representation of one or more items, and wherein the auxiliary content relates to at least one item of the one or more items.

19. The system of claim 18, wherein the post comprises a photograph and the at least one item comprise a visual representation of a product and wherein the auxiliary content comprises a link to one or more of the product or a related product, wherein the link is to a first site providing information regarding one or more of the product or related product or providing one or more of the product or related product for purchase.

20. The system of claim 13, the operations further comprising:
receiving an indication of the post being created by the first user; and
providing the post for display to one or more other including the second user in response to the indication.

21. A non-transitory machine-readable medium comprising instructions stored therein, which when executed by a machine, cause the machine to perform operations comprising:

receiving, over a network, a request to provide auxiliary content relating to a single post generated by a first user from a second user viewing the single post, the single post comprising a visual representation of one or more items and the single post being provided for display to a plurality of other users;

providing, over the network, a search field of a suggestion mechanism for display to the second user in conjunction with displaying the single post, the search field allowing the second user to search for auxiliary content relating to at least one of the one or more items or enter new auxiliary content;

receiving, over the network, a suggestion from the second user responsive to the single post generated by the first user, the suggestion comprising the auxiliary content relating to the at least one of the one or more items and the suggestion being provided via the search field;

providing, over the network, the auxiliary content for display to the first user and the second user but not the plurality of other users prior to the first user accepting the suggestion and subsequent to the second user submitting the suggestion;

providing, over the network, a first selectable graphical element for display to the first user to accept the suggestion and a second selectable graphical element for display to the first user to postpone viewing or accepting the suggestion to a later time;

determining if the first user has accepted the suggestion;

providing, over the network, a suggestion pending notification for display to the second user that provided the suggestion until it is determined that the first user has accepted the suggestion;

adding the auxiliary content to the single post when it is determined that the first user has accepted the suggestion; and providing, over the network, the single post with the auxiliary content for display to the plurality of other users in response to determining that the first user selected the first selectable graphical element to accept the suggestion.

* * * * *